United States Patent [19]
Kumar et al.

[11] Patent Number: 6,073,021
[45] Date of Patent: *Jun. 6, 2000

[54] ROBUST CDMA SOFT HANDOFF

[75] Inventors: Sarath Kumar, Eatontown; Wen-Yi Kuo, Parsippany; Kiran M. Rege, Marlboro, all of N.J.

[73] Assignee: Lucent Technologies, Inc., Murray Hill, N.J.

[*] Notice: This patent is subject to a terminal disclaimer.

[21] Appl. No.: 08/866,759

[22] Filed: May 30, 1997

[51] Int. Cl.$^7$ ....................................... H04Q 7/20
[52] U.S. Cl. .................. 455/442; 455/436; 455/437; 370/331
[58] Field of Search ................................. 455/436, 437, 455/439, 442, 443, 525; 370/331, 335, 342; 375/200, 206

[56] References Cited

U.S. PATENT DOCUMENTS

| | | | |
|---|---|---|---|
| 5,327,577 | 7/1994 | Uddenfeldt | 455/442 |
| 5,392,331 | 2/1995 | Patsiokas et al. | 455/442 |
| 5,530,910 | 6/1996 | Taketsugu | 455/444 |
| 5,640,414 | 6/1997 | Blakeney, II et al. | 455/436 |
| 5,722,074 | 2/1998 | Muszynski | 455/436 |

*Primary Examiner*—Thanh Cong Le
*Assistant Examiner*—Yemane Woldetatios

[57] ABSTRACT

A method for increasing the success rate for soft handoffs, particularly under rapidly fluctuating fading conditions, using traffic channels of active set base stations. In one embodiment of the present invention, increased success rate for soft handoffs is achieved using a candidate base station, in addition to the active set base stations, to transmit a handoff command message to the mobile-telephone. Specifically, the handoff command message is transmitted by the active set base stations over the traffic channels assigned to mobile-telephone for communicating with the active set base stations, and by the candidate base station over the traffic channel assigned to the mobile-telephone for communicating with a primary base station. Additionally, a pilot signal may be transmitted by the candidate base station to enable the mobile-telephone to coherently demodulate the handoff direction message transmitted by the candidate base station.

21 Claims, 7 Drawing Sheets

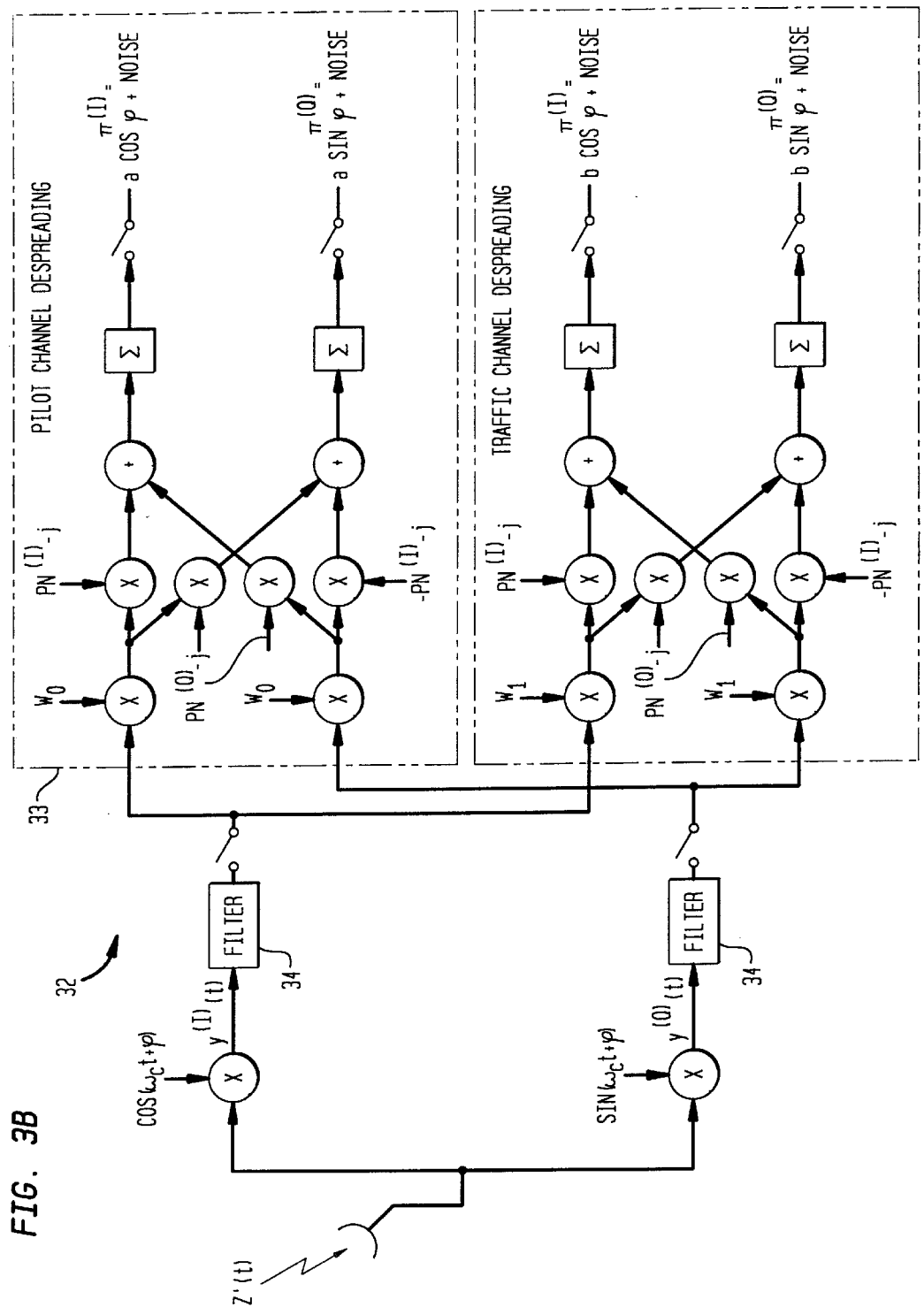

400
ROBUST CDMA SOFT HANDOFF

This application is related to co-pending application Ser. No. 08/920,779.

BACKGROUND OF THE INVENTION

Soft handoffs are one of the greatest advantages of Code Division Multiple Access (CDMA) technology over other multiple access technologies being used for wireless communications systems because of the smooth and seamless transition provided to mobile-telephones traversing from one cell to another cell. Generally, a handoff involves the handling of a call by a progression of base stations to keep the call active as the mobile-telephone traverses from one cell to another cell. A soft handoff is a state in which a mobile-telephone maintains simultaneous radio links with multiple base stations. Referring to FIG. 1, there is shown a schematic of a wireless communication system 10 processing a call in soft handoff with two base stations. As shown in FIG. 1, transmissions to the mobile-telephone 11, i.e., forward link, are carried simultaneously by the base stations 12, 14 participating in the soft handoff. Similarly, transmissions from the mobile-telephone 11, i.e., reverse link, are processed (demodulated) by the base stations 12, 14 before they are appropriately combined at a common frame handler 15 and passed on to the Public Switched Telephone Network (PSTN) 17 via a mobile switching center (MSC) 16. This enables the mobile-telephone 11 to move from the coverage area of one base station to that of another without a user-detectable disruption of communication—that is, the transition is smooth and seamless between cells.

In IS-95 based CDMA wireless communication systems, a soft handoff is initiated by a mobile-telephone (that is engaged in a call) when the mobile-telephone detects a pilot signal from a neighbor base station with a signal strength exceeding a threshold T_ADD. Upon detecting such a pilot signal, the mobile-telephone then transmits a pilot strength measurement message indicating the detection of a candidate base station, which is the neighbor base station with the pilot signal strength exceeding the threshold T_ADD. Specifically, the pilot strength measurement message is transmitted "in-band" on a reverse traffic channel (i.e., traffic channel in the reverse direction) to a set of base stations (referred to herein as active set base stations) comprising of a primary base station and zero or more secondary base stations—that is, the pilot strength measurement message is transmitted on a reverse traffic channel which is being listened to (i.e., demodulated) by all the active set base stations.

All of the active set base stations receiving the pilot strength measurement message will demodulate the message and send the message to the common frame handler 15 where the (demodulated) pilot strength measurement messages are combined to obtain a single message. Subsequently, the (combined) pilot strength measurement message is passed to a call processor (CP) 18, which is an entity for processing signaling messages such as the pilot strength measurement message. Note that the frame handler and the call processor are typically located at a primary base station or MSC, and are well-known in the art. Upon receiving the pilot strength measurement message, the CP proceeds to set up network connections necessary for performing the soft handoff. Specifically, the setting up of network connections involves messaging between the CP, the candidate base station, and terrestrial network infrastructure of the wireless communication system, and establishing a link between the candidate base station and the frame handler. Typically, the CP sends a message to the candidate base station requesting a new traffic channel in the forward direction (i.e., forward traffic channel) be assigned to the mobile-telephone to enable communication with the candidate base station, and informing the candidate base station of the traffic channel being used by the mobile-telephone in the reverse direction (so the candidate base station knows what reverse traffic channel to which it should listen). At the same time, the CP interacts with the terrestrial network infrastructure to set up a link between the candidate base station and the frame handler (to enable proper routing of messages between the candidate base station and the frame handler).

Once these network connections are established and a forward traffic channel is assigned by the candidate base station (for communicating with the mobile-telephone), the CP sends to the active set base stations copies of a handoff direction message, which is a message instructing the mobile-telephone to add the candidate base station to the active set and informing the mobile-telephone what forward traffic channel has been assigned by the candidate base station for communicating with the mobile-telephone. Additionally, upon completion of the network connections setup, the candidate base station will begin to carry the call over the newly assigned forward traffic channel—that is, the candidate base station will carry copies of the forward link transmissions on the newly assigned forward traffic channel, and demodulate the mobile-telephone's reverse link transmissions (and pass them to the frame handler).

Once the candidate base station is added to the active set (by the mobile-telephone), the candidate base station becomes a secondary base station—that is, the mobile-telephone will now listen to the candidate base station in addition to all of the other base stations which were already in the mobile-telephone's active set. Assuming that the primary base station and the former candidate base (now a secondary base station) are the only base stations in the mobile-telephone's active set, the mobile-telephone will communicate with both of these base stations until the pilot signal strength of one of the base stations, as measured at the mobile-telephone, falls below a threshold T_DROP for a period TT_DROP. Upon the occurrence of such an event, the mobile-telephone sends an "in-band" pilot strength measurement message to the active set base stations indicating the detection of a weak base station, i.e., which is the active set with the pilot signal strength below T_DROP for the period TT_DROP. This pilot strength measurement message is subsequently used by the wireless communication system to have the weak base station "drop" out of the call and be removed from the active set—that is, the weak base station and the mobile-telephone will cease to communicate with each other.

Under rapidly fluctuating fading conditions, such as those due to building blockage, sharp terrain change, mobile speed, etc., field testing has revealed that the success rate of CDMA soft handoffs can decrease significantly. This significant decrease in success rate is due, in major part, to delays associated with messaging during network connections setup. Specifically, from the time the mobile-telephone transmits the pilot strength measurement signal (to the active set base stations) to the time the active set base stations transmit the handoff direction message (to the mobile-telephone), the mobile-telephone may move to a new position where the signal-to-noise ratio on the forward traffic channels between the active base stations and the mobile-telephone is significantly decreased, thereby inhibiting the mobile-telephone's ability to receive the handoff direction message—that is, the signal-to-noise ratio of the handoff direction message is significantly decreased. The greater the network connections setup time, the greater the likelihood of the mobile-telephone traveling to a position where the decreasing signal-to-noise ratio of the handoff direction message is significantly decreased. Under rapidly fluctuating fading conditions, this likelihood is further increased.

Significant decreases in the signal-to-noise ratio (of the handoff direction message) results generally from the movement of the mobile-telephone, during network connections setup, to a position where a new obstacle, e.g., a building, becomes situated along the path of the handoff direction message (from the transmitting active set base station to the mobile-telephone), or a position where signals transmitted by the candidate base station can be received at a significantly higher level resulting in increased overall interference level to the handoff direction message, e.g., closer to the candidate base station and farther from the active set base stations.

One way to alleviate this problem is to reduce the time necessary to complete the network connections setup. This reduces the distance a mobile-telephone can travel during the network connections setup, thereby decreasing the likelihood of the mobile-telephone traveling to a position with poorer signal-to-noise ratio (of the handoff direction message). However, such a solution is difficult to achieve because of hardware and communication resource limitations in the network infrastructure of existing wireless communication systems. Accordingly, there exists a need for increasing the success rate of soft handoffs using the network infrastructure of existing wireless communication systems, particularly under rapidly fluctuating fading conditions.

SUMMARY OF THE INVENTION

The present invention is a method for increasing the success rate for soft handoffs, particularly under rapidly fluctuating fading conditions, using forward traffic channels assigned to a mobile-telephone for communicating with active set base stations. In one embodiment of the present invention, increased success rate for soft handoffs is achieved using a candidate base station, in addition to the active set base stations, to transmit a handoff direction message to the mobile-telephone. Specifically, in this embodiment, the handoff direction message is transmitted by the active set base stations over the forward traffic channels already assigned to the mobile-telephone for communicating with the active set base stations, and by the candidate base station via means of simulating the forward traffic channel assigned to the mobile-telephone for communicating with one of the active set base stations, such as a primary base station. For example, in a CDMA wireless communication system, the candidate base station would transmit the handoff command message using the modulation scheme, pair of pseudo-noise sequences, pseudo-noise sequence phase offsets, and Walsh function assciated with the forward traffic channel being used by the primary base station for communicating with the mobile-telephone. In this embodiment of the present invention, the candidate base station also transmits a pilot signal (with the handoff direction message) using the pilot channel of the primary base station to enable the mobile-telephone to coherently demodulate the handoff direction message (transmitted from the candidate base station). Transmittal of the handoff direction message by the candidate base station counters some of the major causes for failed soft handoffs, such as new obstacles between the mobile-telephone and the active set base stations and increased interference due to signals transmitted from the candidate base station. Advantageously, the present invention can be implemented using the network infrastructure of existing wireless communication systems

BRIEF DESCRIPTION OF THE DRAWINGS

The features, aspects, and advantages of the present invention will become better understood with regard to the following description, appended claims, and accompanying drawings where:

FIGS. 3a and 3b depict simplified schematics of a base station and a mobile-telephone using a Walsh function, a pair of spreading sequences with a specific phase offset, and a modulation scheme to uniquely identify a forward traffic channel over which a coded voice signal $b_1(t)$ is transmitted;

DETAILED DESCRIPTION

Figure 1:
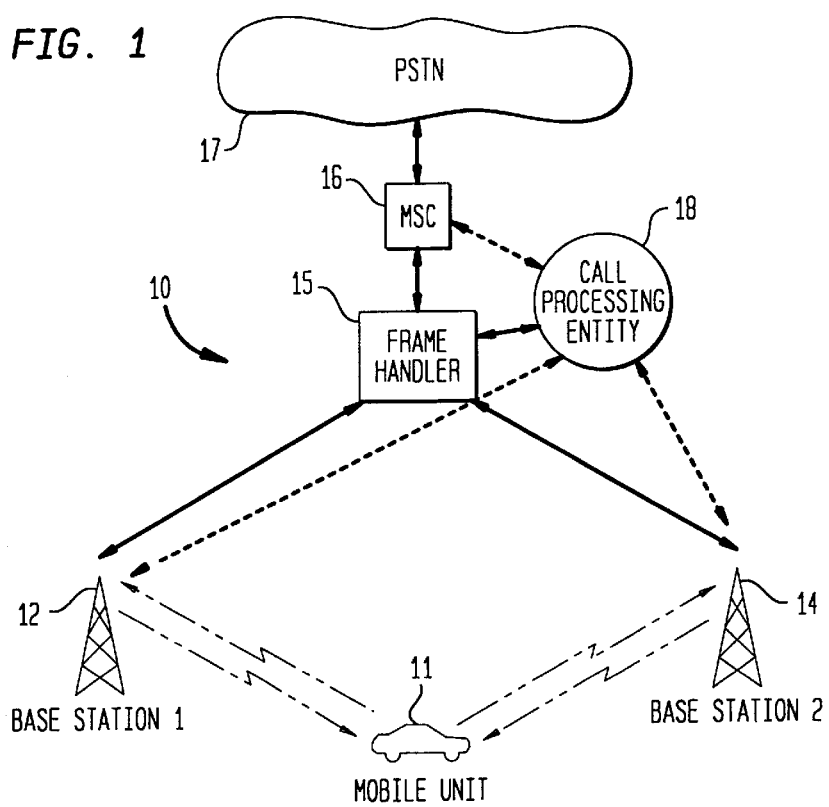
FIG. 1. Depicts a schematic of a wireless communication system processing a call in a soft handoff with two base stations.
Figure 2:
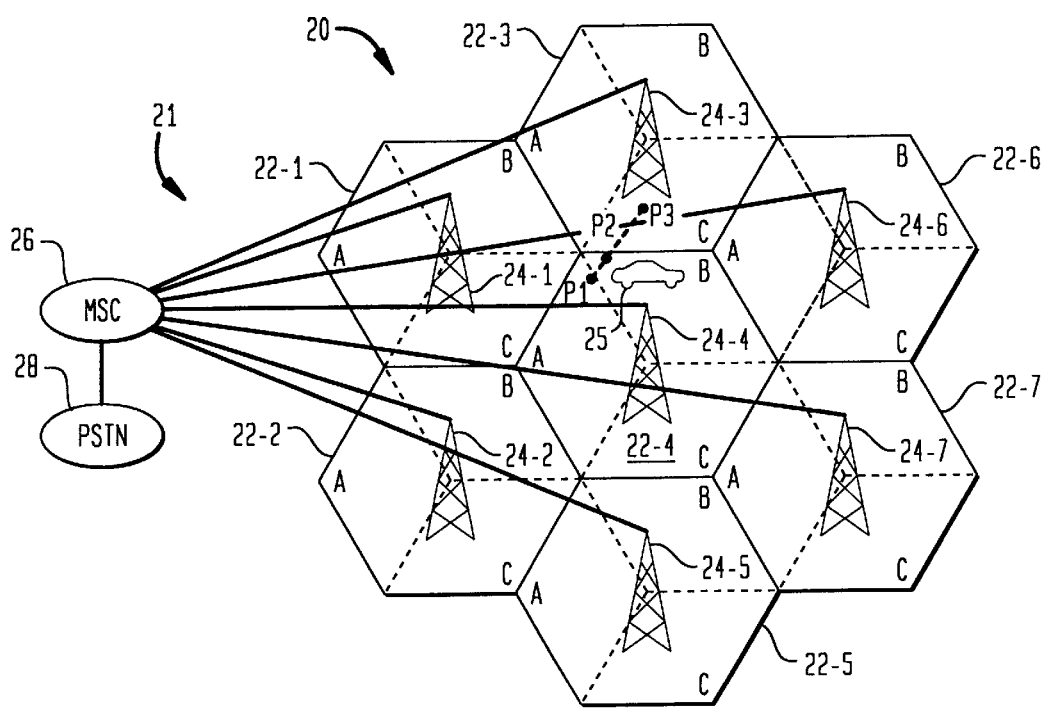
FIG. 2 depicts mobile-telephone traversing the geographical coverage area of a wireless communication system in accordance with one embodiment of the present invention.

Referring to FIG. 2, there is shown a mobile-telephone 25 traversing the geographical coverage area 20 of a wireless communication system 21 in accordance with one embodiment of the present invention. As shown in FIG. 2, the geographical coverage area 20 is divided into a plurality of cells 22-1, ..., 7, which are further divided into sectors A, B and C. Each cell 22-1, ..., 7 has an associated base station 24-1, ..., 7, which provides wireless communication services to the cell. Each of the base stations 24-1, ..., 7 is connected to a mobile switching center (MSC)26, which is connected to a public telephone switching network (PTSN)28. Base stations, mobile switching centers and public telephone switching networks are well-known in the art.

Communication is achieved between the wireless communication system 21 and the mobile-telephone 26 by the transmission of signals (from and to the base stations) over a variety of communication channels. Such channels include traffic channels for transmitting voice (or data) signals, and pilot channels for transmitting pilot signals, wherein the pilot signals are used primarily for power measurement (to initiate call establishment, handoffs, etc.) and to allow the mobile-telephones to perform coherent demodulation of traffic channel signals. Traffic channels and pilot channels are well-known in the art, and the manner in which these (and other) channels are defined depends on the specific implementation of the wireless communication system.

For purposes of discussion, the present invention will be described herein with respect to a wireless communication system and a mobile-telephone employing Code Division Multiple Access (CDMA) techniques based on the well-known IS-95 wireless communication standards. It should be apparent to one of ordinary skill in the art that the present invention can be equally applicable to similar wireless communication systems employing other CDMA techniques (e.g. ones based on the ANSI J 008 standard) or those employing other types of multiple access techniques, such as time division multiple access (TDMA), frequency division multiple access, etc.

In IS-95, traffic channels and pilot channels are defined by a combination of modulation scheme, spreading sequences, spreading sequence phase offsets, and short sequences. Specifically, IS-95 uses a modulation scheme over a specific frequency range to identify a particular wireless communication system, pair of (in-phase and quadrature) spreading sequences referred to herein as pseudo-noise (PN) sequences $PN^{(I)}$ and $PN^{(Q)}$ with different phase offsets to identify particular base stations (e.g., $PN^{(I)}$-1 and $PN^{(Q)}$-1 for base station 24.1, $PN^{(I)}$-2 and $PN^{(Q)}$-2 for base station 24.2, etc.), and a set of short sequences referred to herein as orthogonal Walsh functions (e.g., $W_0$, $W_1$, ...) to identify particular channels over which signals are transmitted by a base station. In one embodiment, each base station in the (IS-95 based CDMA) wireless communication system uses the same modulation scheme, the same pair of $PN^{(I)}$ and $PN^{(Q)}$ sequences but with different phase offsets (to distinguish one base station from another), and the same set of Walsh functions (to distinguish one channel from another at the same base station).

Figure 3A:
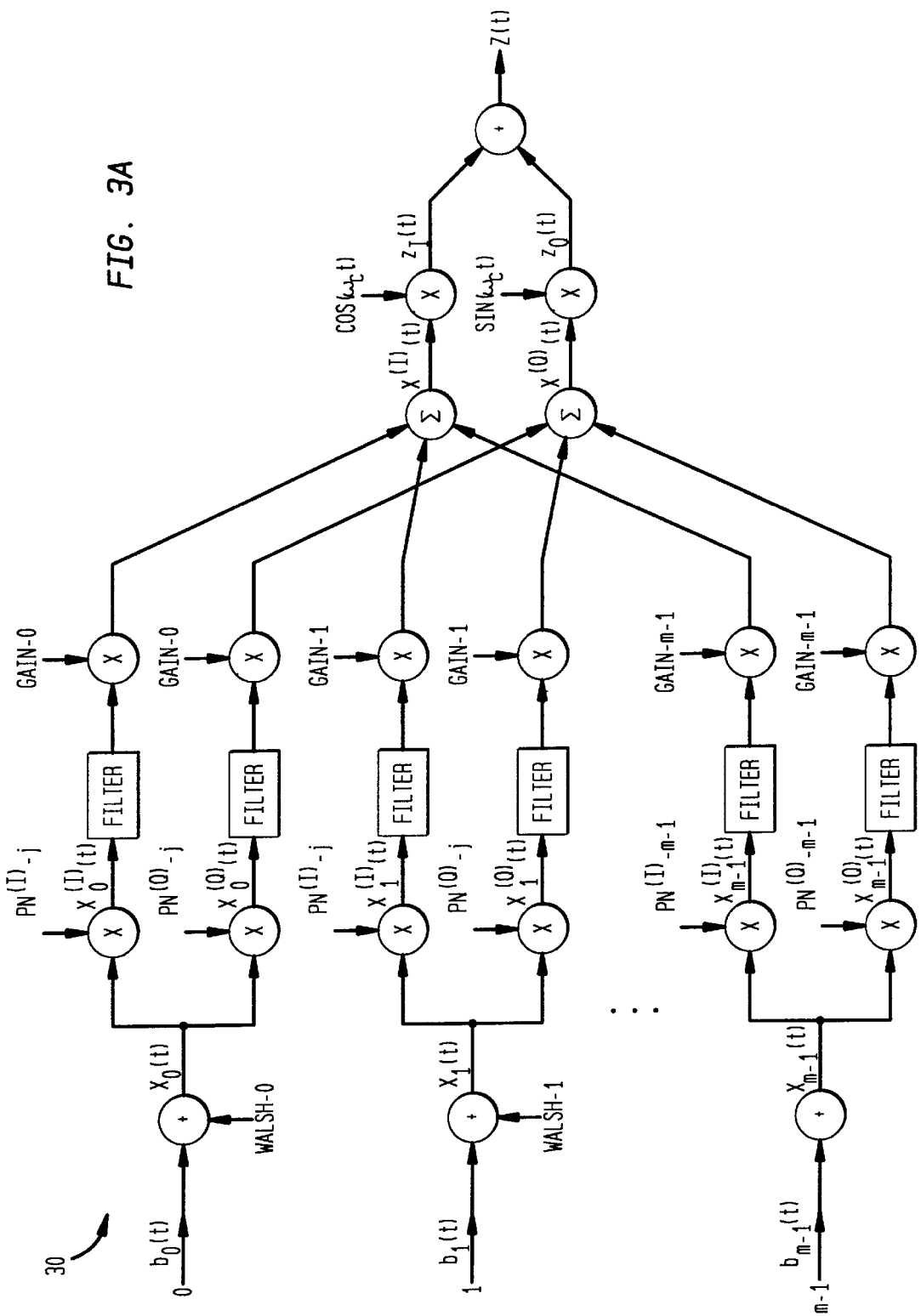

Referring to FIGS. 3a and 3b, there are shown simplified schematics of a base station 30 and a mobile-telephone 32 using a Walsh function, a pair of spreading sequences ($PN^{(I)}$-j and $PN^{(Q)}$-j) with a specific phase offset (where j represents the phase offset associated with the base station 30), and a modulation scheme to uniquely identify a forward traffic channel over which a coded voice signal $b_1(t)$ is transmitted. As shown in FIG. 3a, a pilot signal $b_0(t)$ and coded voice signals $b_1(t), \ldots, b_{M-1}(t)$ are multiplied by the base station 30 with Walsh functions $W_0, W_1, \ldots, W_{M-1}$ to produce output signals $X_0(t), X_1(t), \ldots, X_{M-1}(t)$, respectively. Each of the outputs $X_0(t), X_1(t), \ldots, X_{M-1}(t)$ is then multiplied by a pair of PN sequences $PN^{(I)}$-j and $PN^{(Q)}$-j to produce a pair of "chip streams" $X_0^{(I)}(t), X_0^{(Q)}(t), X_1^{(I)}(t), X_1^{(Q)}(t), \ldots, X_{m-1}^{(I)}(t), X_{M-1}^{(Q)}(t)$, respectively. These chip streams are then filtered and suitably amplified before all of the "in-phase" (I) streams, e.g. $X_0^{(I)}(t), X_1^{(I)}(t), \ldots, X_{M-1}^{(I)}(t)$, are added together to form a combined in-phase output $X^{(I)}(t)$ and all of the "quadrature" (Q) streams, e.g., $X_0^{(Q)}(t), X_1^{(Q)}(t), \ldots, X_{M-1}^{(Q)}(t)$, are added together to form a combined quadrature output $X^{(Q)}(t)$. The combined outputs $X^{(I)}(t)$ and $X^{(Q)}(t)$ are then used to respectively modulate in-phase and quadrature carriers $\cos(\omega_c t)$ and $\sin(\omega_c t)$. The resulting signals are added (to get Z(t)) and transmitted via an antenna by base station 30. Thus, the coded voice signal $b_1(t)$ is transmitted over a forward traffic channel defined by the pair of spreading sequences $PN^{(I)}$-j and $PN^{(Q)}$-j, the Walsh function $W_1$ and the carriers $\cos(\omega_c t)$ and $\sin(\omega_c t)$. By comparison, the pilot signal $b_0(t)$ is transmitted over a pilot channel defined by the same pair of spreading sequences $PN^{(I)}$-j and $PN^{(Q)}$-j, the same carrier signals $\cos(\omega_c t)$ and $\sin(\omega_c t)$, but a different Walsh function $W_0$.

Mobile units within the coverage area of the base station 30, such as the mobile-telephone 32, receive a signal Z'(t) comprising the signal Z(t) plus some interference due to a variety of factors. To obtain the original coded voice signal $b_1(t)$, the mobile-telephone 32 must be able to demodulate the corresponding forward traffic channel, as will be described herein. As shown in FIG. 3b, at the mobile-telephone 32, the received signal Z'(t) is frequency shifted to the base-band using locally generated carrier signals $\cos(\omega_c t + \phi)$ and $\sin(\omega_c t + \phi)$. From the resulting base-band signals $y^{(I)}(t)$ and $y^{(Q)}(t)$, the pilot channel signal and the forward traffic channel signal (i.e., signals modulated with the pilot signal $b_0(t)$ and coded voice signal $b_1(t)$, respectively) are filtered (by filters 34) and de-spread (by a demodulator 33) using appropriate combinations of the spreading sequences $PN^{(I)}$-j and $PN^{(Q)}$-j associated with base station 30 and Walsh functions (i.e., Walsh function $W_0$ for the pilot and Walsh fuiction $W_1$ for the traffic channel in this case). De-spreading the filtered signal using the spreading sequence $PN^{(I)}$-j and $PN^{(Q)}$-j suppresses the interference due to the transmission of signals by other base stations in the same wireless communication system, thereby enhancing the quality (at the mobile-receiver) of the signals transmitted from the desired base station 30. The use of orthogonal Walsh functions to distinguish between different traffic and overhead (e.g. pilot) channels minimizes interference due to the transmission of signals by the same base station 30 to other users in the same coverage area.

Specifically, in one embodiment, the demodulator 33 includes two parts: one which de-spreads the signal on the pilot channel (i.e., pilot channel signal) and one which de-spreads the signal on the desired traffic channel (i.e., traffic channel signal). As shown in FIG. 3b, each of the de-spread pilot channel signal is typically averaged over a few symbols to suppress noise (e.g., $\overline{\Pi}(I)$ and $\overline{\Pi}(Q)$) and then used to coherently demodulate the de-spread traffic channel signal (e.g., $\tau(I)$ and $\tau(Q)$) to produce a demodulated signal $b'_1(t)$. The signal $b'_1(t)$ is then fed to a soft decision Viterbi decoder, not shown, to extract the voice signal $b_1(t)$. Note that such techniques are well known in the art.

The example depicted in FIGS. 3a and 3b assume the transmission signal Z(t) will travel a single path to the mobile-telephone 32. However, a signal transmitted from a base station will typically travel several paths to the mobile-telephone—that is, a single transmitted signal may arrive as multiple signals via different paths to the mobile-telephone. Such signals are known in the art as multi-path signals, which include line-of-sight signals and non-line-of-sight signals, as the terms are known in the art. To compensate for possible signal degradation, IS-95 based mobile-telephones separately demodulate several multi-path signals which are then combined to produce a net overall output, i.e., obtain a single strong signal. In one embodiment, the mobile-telephone includes a well-known RAKE receiver for separately demodulating multi-path traffic channel signals (received by the mobile-telephone) which can then be combined to form a strong output signal. Moreover, when the mobile-telephone is in soft handoff with multiple base stations, the RAKE receiver is capable of separately demodulating the strong multipath signals being received from any combination of the multiple base stations and then combining them to produce a single output signal, as will be described herein.

Figure 4:
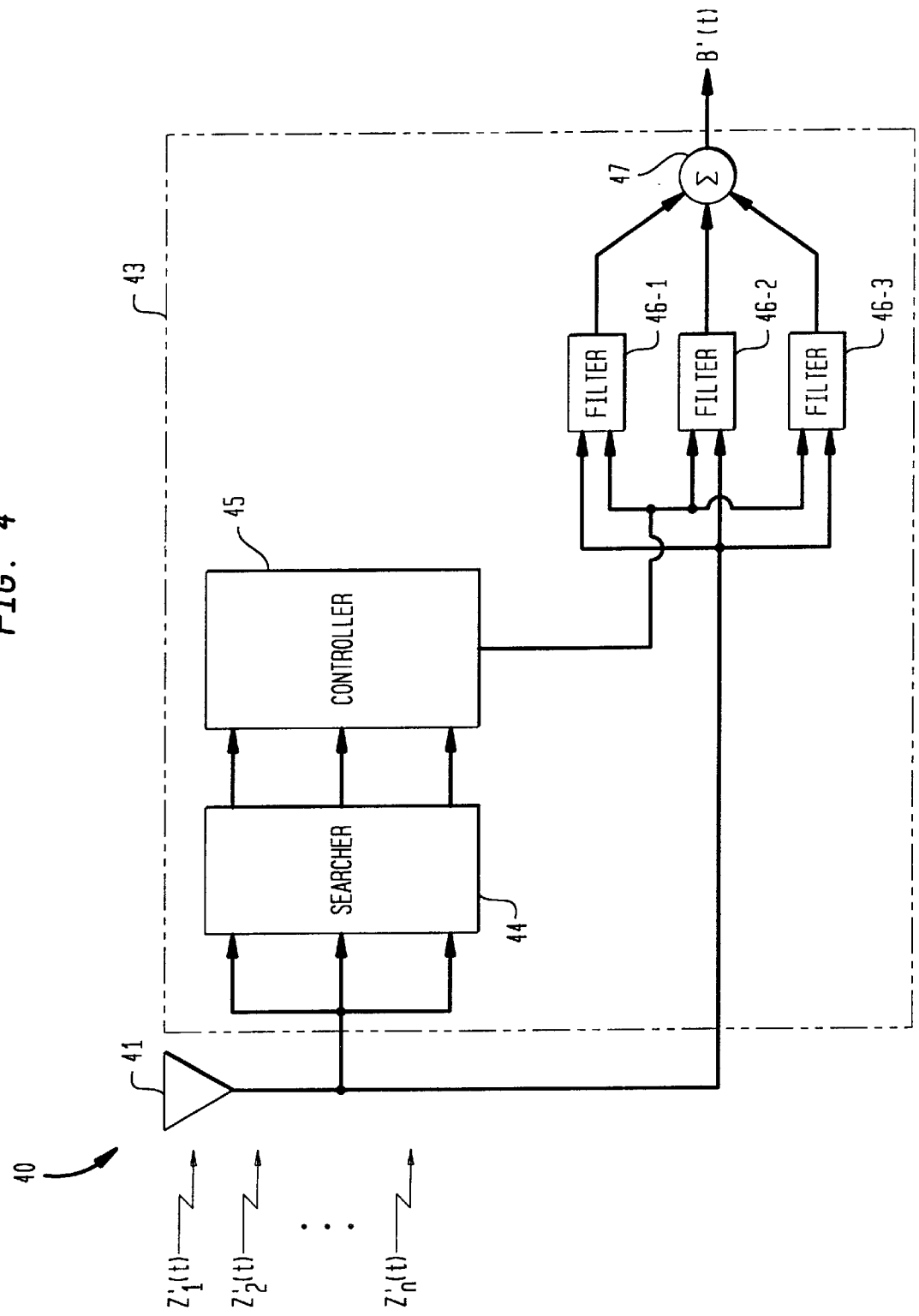
FIG. 4 depicts a functional block diagram of a mobile-telephone equipped with a RAKE receiver used in accordance with one embodiment of the present invention.

Referring to FIG. 4, there is shown a functional block diagram of a mobile-telephone 40 equipped with a RAKE receiver used in accordance with one embodiment of the present invention. As shown in FIG. 4, the mobile-telephone 40 includes an antenna 41 for receiving multi-path signals $z'_1(t), z'_2(t), \ldots, z'_n(t)$ and a RAKE receiver 43 for processing the multi-path signals to produce a single output signal B(t). In one embodiment, the RAKE receiver 43 comprises a searcher 44, a controller 45, a plurality of fingers 46-1, ..., 3, and a summer 47, all of which are well-known in the art. Note that a finger performs essentially the same function as the demodulator 33 of FIG. 3b. Specifically, a finger is a demodulator that can independently lock on to a different multipath signal and time shift the multi-path signal to account for path delay.

As shown back in FIG. 4, in operation, the antenna 41 receives the multi-path signals $z'_1(t), z'_2(t), \ldots, z'_n(t)$ transmitted from one or more base stations in the wireless communication system. The received multi-path signals $z'_1(t), z'_2(t), \ldots, z'_n(t)$ are then scanned by the searcher 44 to determine whether they were transmitted from particular base stations and to estimate their strength at the mobile-telephone. Specifically, the searcher 44 scans the pilot signals in the multi-path signals $z'_1(t), z'_2(t), \ldots, z'_n(t)$ to determine whether the multi-path signals were transmitted from active set base stations or neighbor base stations, and to estimate the strength of the pilot signals. Remember that active set base stations are base stations in communication (i.e., decode messages from and transmit messages to) with the mobile-telephone, and include a primary base station (i.e., base station with direct control of call processing for the mobile-telephone) and zero or more secondary base stations (i.e., base stations participating in soft handoff, other than the primary base station). By contrast, neighbor base stations are base stations adjacent to the primary base station which are typically not in communication with the mobile-telephone. The active set and neighbor base stations are indicated on a neighbor list, i.e., a list of neighboring base stations, that is provided to the mobile-telephone by the primary base station.

In one embodiment, the searcher 44 continually scans (i.e. attempts to lock on to and measure the signal strength of) pilot signals in a "search window" around the spreading (or PN) sequence phase offsets where the active set and neighbor base stations (also referred to herein collectively as neighbor list base stations) are known to be transmitting. The searcher records the phases at which pilot signals were actually detected and the corresponding signal strengths. Note that in IS-95 based CDMA wireless communication systems, each base station is configured to transmit its pilot signal using the same pair of spreading sequences but at different phase offsets. Thus, the phase offset of the spreading sequence (at the mobile-telephone receiver) can be used to identify the transmitting base station, as is well-known in the art.

The recorded phase offsets and corresponding signal strengths at which pilot signals are detected by the searcher are sent to the controller 45 which (based on the measurements passed on to it by the searcher) instructs the fingers 46-1, . . . ,3 to individually process the three strongest active set (multi-path) signals, i.e., signals transmitted from the active set base stations, to obtain the desired signal. Note that these active set multipath signals are individually processed by the fingers 46-1, . . . ,3 in a manner similar to that described for signal Z'(t) by the demodulator 33 of FIG. 3b. Specifically, the three strongest active set (multi-path) signals are coherently demodulated, time shifted (to account for different path delays) and then combined by the summer 47 to produce a single output signal B'(t).

Figure 5:
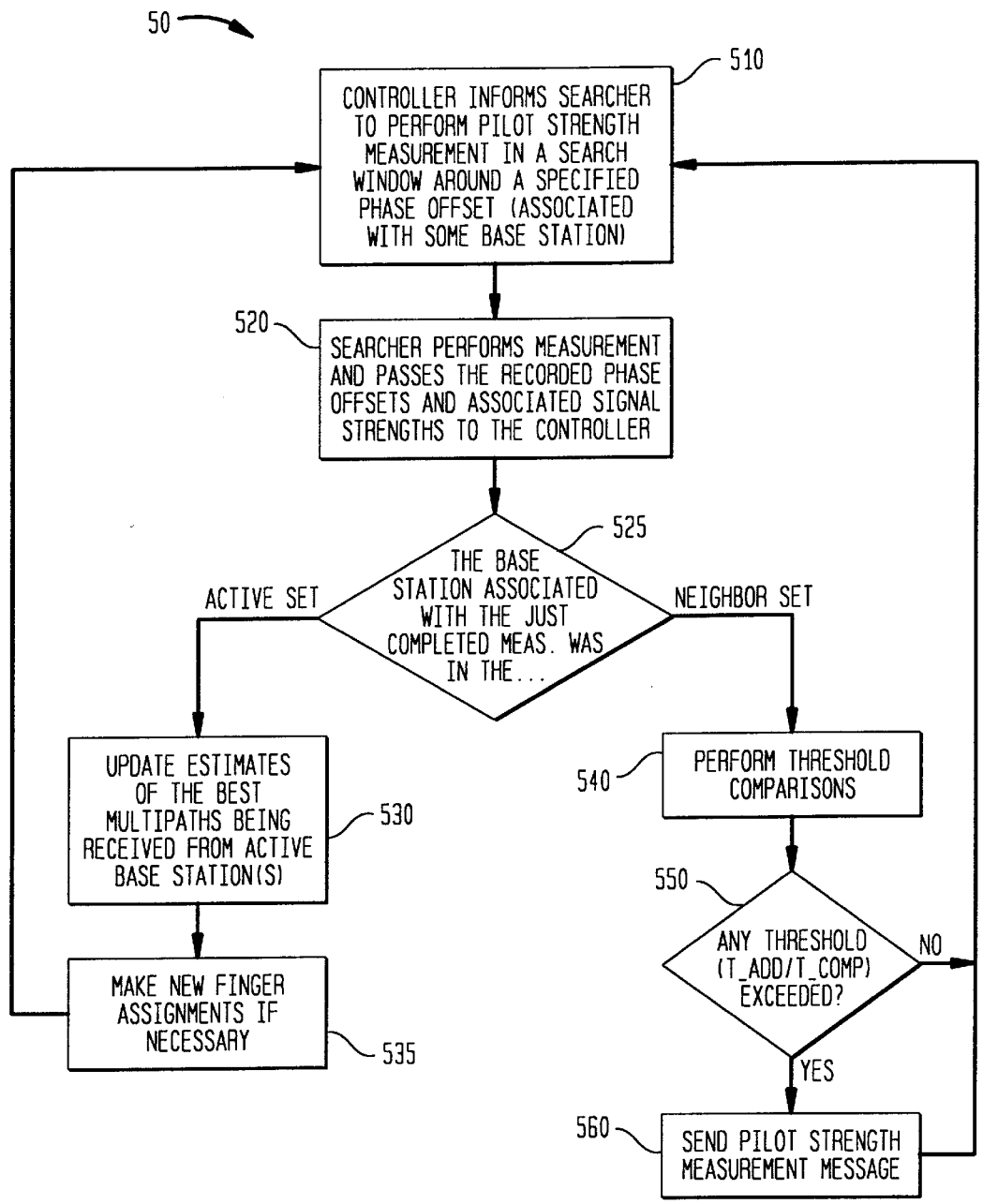
FIGS. 5 and 6 depict flowcharts illustrating a soft handoff process using the mobile-telephone of FIG. 4 and wireless communication system of FIG. 2.
Figure 6:
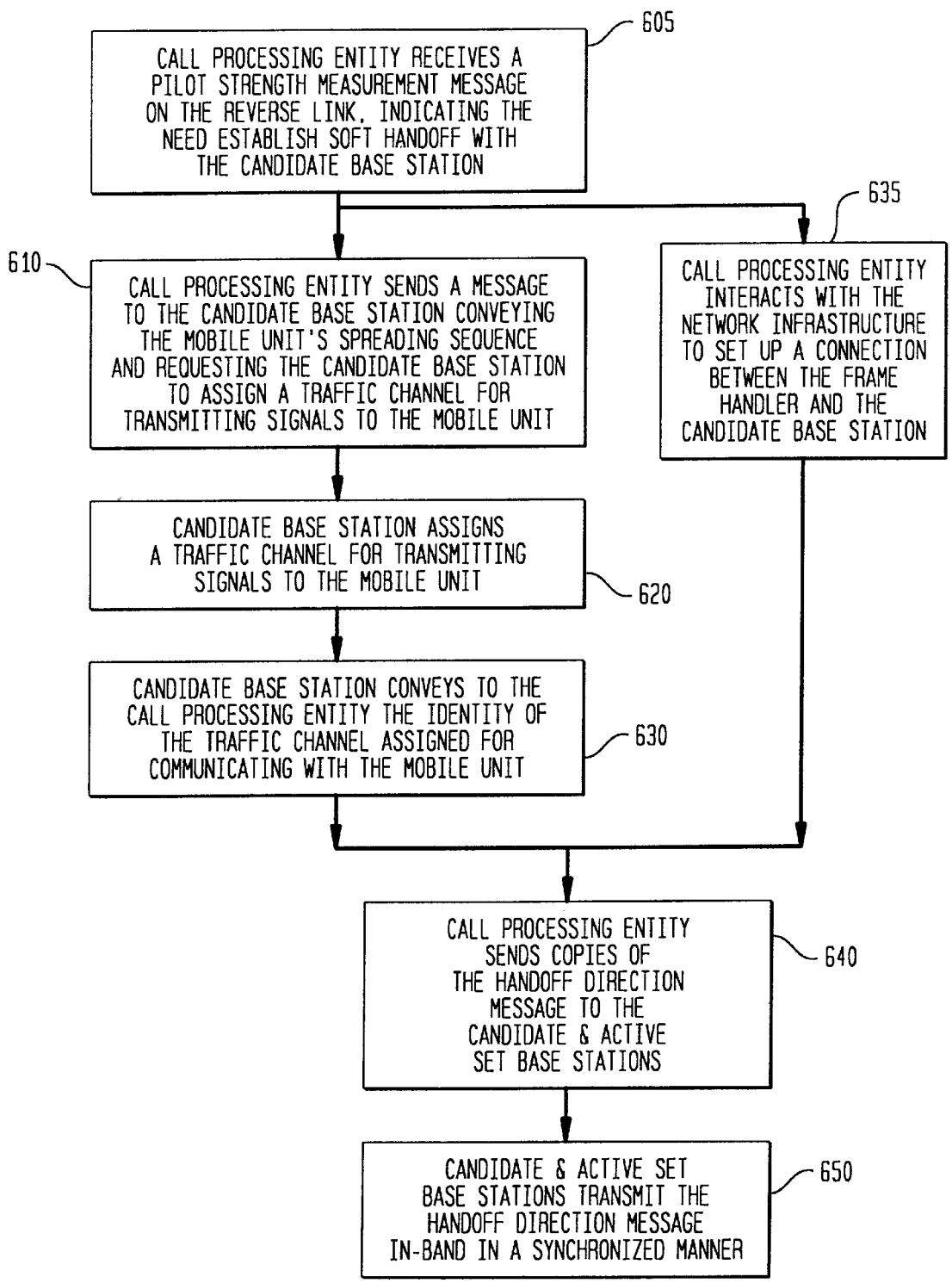

One of the major benefits of the RAKE receiver is that it provides the mobile-telephone with the ability to simultaneously demodulate signals being received from more than one base station during a call. This functionality allows the wireless communication system and the mobile-telephone to perform soft handoffs. Referring to FIGS. 5 and 6, there are shown flow charts 50 and 60 illustrating a soft handoff process respectively from the mobile-telephone and the (network) infrastructure viewpoints in accordance with one embodiment of the present invention incorporated into the above-described wireless communication system and mobile-telephone. It is assumed in both FIGS. 5 and 6 that the mobile-telephone is engaged in a call, i.e., communicating with one or more base stations which are in its active set. While the mobile-telephone is engaged in a call, its searcher is continuously scanning received (multi-path) signals under the direction of the controller—that is, in step 510, the controller instructs the searcher to perform pilot strength measurements within a search window around a (nominal) phase offset associated with an active set or neighbor base station. In step 520, the searcher performs the measurements and reports to the controller the phases and the corresponding signal strengths at which the pilot signals were detected.

If the measurements relate to multi-path signals from an active set base station, the controller uses these measurements to update its estimate of the best multi-paths being received from the mobile-telephone's active set, in step 530. In step 535, the controller makes new RAKE receiver finger assignments based on the updated estimate where appropriate—that is, the controller instructs one of the fingers to demodulate the current multi-path signal if it is one of the three strongest (multi-path) signals from the active set base stations. On the other hand, if the measurement relates to a base station in the mobile-telephone's neighbor set (i.e., neighbor list base stations not in the active set), in step 540, the controller uses this measurement to carry out threshold comparisons (e.g. comparing the measured pilot strength with T_ADD) and if a relevant threshold is exceeded, the controller prepares a PILOT STRENGTH MEASUREMENT message which is then transmitted in-band over the mobile-telephone's reverse traffic channel (step 560). The cycle resumes (as shown in FIG. 5) after steps 550 or 560.

Within the wireless communication system, as shown in FIG. 6, when the PILOT STRENGTH MEASUREMENT message arrives at the frame handler, it passes it on to the call processor (CP), in step 605; The CP then proceeds to set up the necessary network connections. Specifically, the call processor sends a message to the candidate base station, in step 610, informing the candidate base station of the mobile-telephone's reverse traffic channel and requesting the candidate base station to assign a forward traffic channel to communicate with the mobile-telephone. The candidate base station assigns a traffic channel (identified at the candidate base station by a Walsh function) for communicating with the mobile-telephone, in step 620, and sends a message back to the CP conveying the identity of the assigned forward traffic channel. While steps 610, 620 and 630 are being performed, the CP also interacts with the terrestrial network infrastructure to establish a link between the frame handler and the candidate base station (to enable proper routing of messages between the candidate base station and the frame handler), in step 635. Once the setup is complete (i.e. both steps 635 and 630 have been completed), the CP prepares a HANDOFF DIRECTION message and sends, via the frame handler, copies of this message to all of the active base stations and the candidate base station, in step 640. The CP also conveys to the candidate base station the primary base station's forward traffic channel assigned to the mobile-telephone, i.e., PN-sequence phase and the Walsh function of the forward traffic channel being used by the primary base station for communicating with the mobile-telephone. All of the active set and candidate base stations transmit the HANDOFF DIRECTION message in a synchronous manner, in step 650, as will be described herein. Upon receiving this message, the mobile-telephone places the candidate base station in its active set and begins communicating with the candidate base station (now a secondary base station) in addition to all of the base stations already in its active set.

In one embodiment of the present invention, in step 650, the HANDOFF DIRECTION message is transmitted "in band" by each of the active set base stations on the forward traffic channels assigned (by each of the active set base stations, respectively) for communicating with the mobile-telephone whereas the candidate base station uses the forward traffic channel assigned by the primary base station (or a secondary base station) for communicating with the mobile-telephone. This means that the candidate base station will use, for transmitting the HANDOFF DIRECTION message, the primary base station's PN-sequence phase offset and the Walsh finction being used by the primary base station for communicating with the mobile-telephone. To enable the mobile-telephone to perform coherent demodulation during the reception of the HANDOFF DIRECTION message, the candidate base station also transmits, for at least the duration of the HANDOFF DIRECTION message, a pilot signal using the phase offset associated with the primary base station. In one embodiment, the transmission of this pilot signal (by the candidate base station) should start a few frames before the transmission of the HANDOFF DIRECTION message to allow the mobile-telephone to detect the presence of this pilot signal as a new multipath signal.

In current CDMA wireless communication systems, the HANDOFF DIRECTION message is sent to the mobile-telephone using only the active set base stations. Under rapidly fluctuating fading conditions, the HANDOFF DIRECTION message transmitted by the active set base stations may not be received by the mobile-telephone. This is typically due to new obstacles in the path of the HANDOFF DIRECTION message (between the active set base stations and the mobile-telephone) and increased interference due to signals transmitted from the candidate base station. Advantageously, by using the candidate base station to transmit the HANDOFF DIRECTION message over a simulated primary base station traffic channel, the present invention counters some of the major causes for failed soft handoffs. The candidate base station's transmission of the HANDOFF DIRECTION message (over the traffic channel used by the primary base station to transmit signals to the mobile-telephone) is equivalent to intentionally creating another simulcast path from the candidate base station (together with the active base stations' transmission of the same message). The mobile-telephone will perceive the candidate base station's HANDOFF DIRECTION message as if it was coming via another multi-path of the primary base station. This increases the probability that the HANDOFF DIRECTION message will be correctly received by the mobile-telephone, thereby increasing the success rate of the soft handoff.

Figure 7:
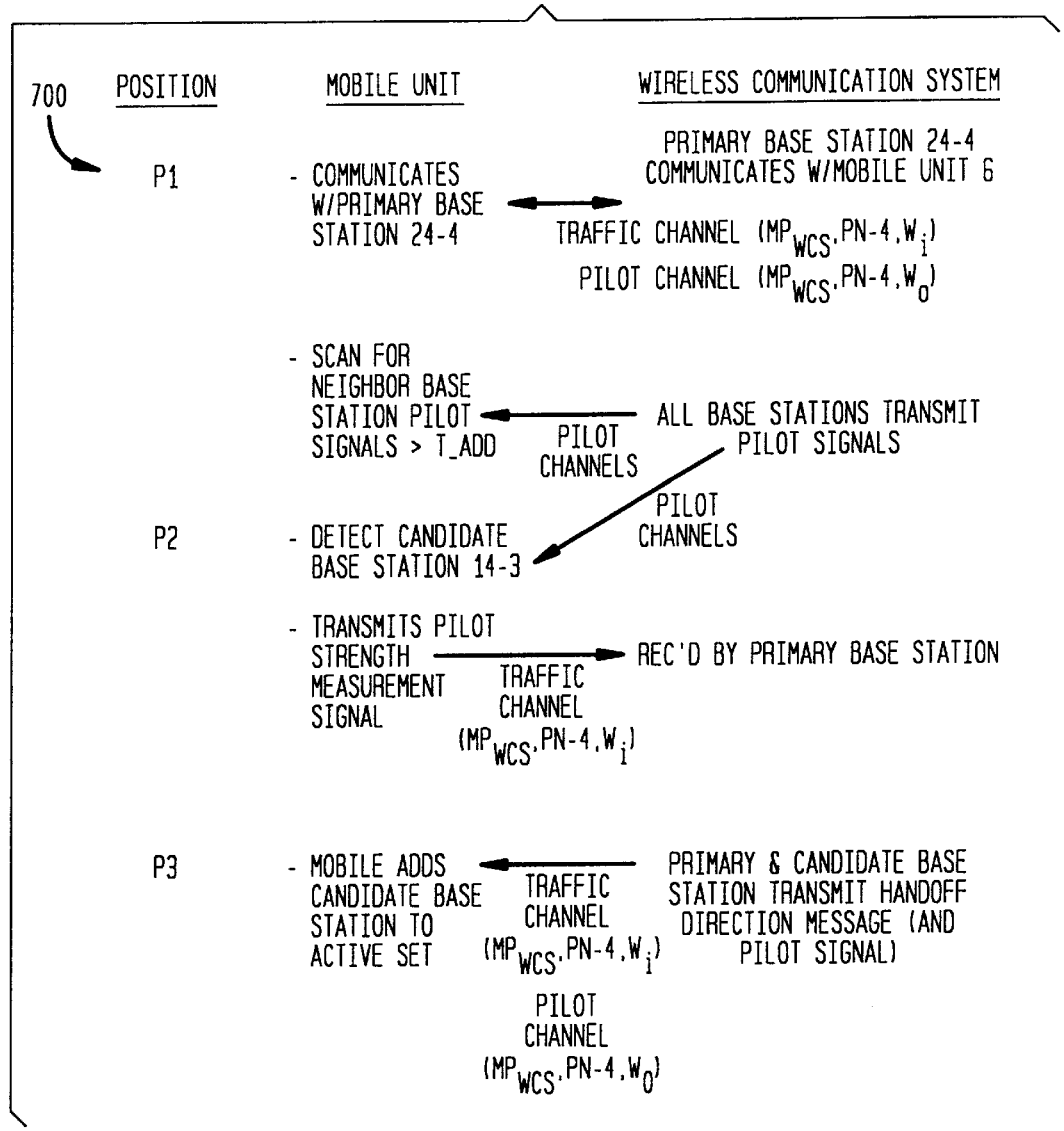
FIG. 7 depicts an example of a soft handoff in accordance with the steps of flowcharts of FIGS. 5 and 6.

Referring to FIG. 7, there is shown an example 700 of a soft handoff being performed by the mobile-telephone 25 of FIG. 2 in accordance with the steps of flowcharts 500 and 600. In this example, suppose the mobile-telephone 25 is traveling from position P1 to position P2 to position P3 in the wireless communication system 21. As shown in FIG. 7, at position P1, the base station 24-4 is the primary base station (and the only base station in the active set) for mobile-telephone 25, which is engaged in a call using a forward traffic channel ($MP_{WCS}$, $PN^{(I)}$-3, $PN^{(Q)}$-3,$W_i$), where $MP_{WCS}$ represents the modulation protocol of the wireless communication system 21, $PN^{(I)}$-3 and $PN^{(Q)}$-3 represent the pair of (in-phase and quadrature) spreading sequences associated with the primary base station 24-4, and $W_i$ represents the Walsh function i being used by the primary base station 24-4 for communicating with the mobile-telephone. Note that the primary base station uses a pilot channel ($MP_{WCS}$, $PN^{(I)}$-3, $PN^{(Q)}$-3, $W_0$) to transmit its pilot signal, wherein $W_0$ represents the Walsh fumction assigned for pilot signal transmissions the primary base station 24-4. Further note that at position P1 the mobile-telephone will not detect any neighbor base station (multi-path) signals that will exceed the threshold T_ADD.

Upon arriving at position P2, the mobile-telephone 25 will detect (multi-path) signals from the base station 24-3 exceeding the threshold T_ADD. At this time, the base station 24-3 becomes a candidate base station. The mobile-telephone transmits a PILOT STRENGTH MEASUREMENT message to the active set base stations, i.e., base station 24-4, indicating the detection of a candidate base station 24-3. The primary base station 24-4 passes (via the frame handler) the PILOT STRENGTH MEASUREMENT message to the call processing entity which then proceeds to set up the necessary network connections.

Meanwhile, as the network connections are being set up, the mobile-telephone moves to position P3 nearer the candidate base station (where the mobile-telephone will encounter increased interference when trying to receive signals from the primary base station due to signals transmitted from the candidate base station). Upon completing the network connections setup, a HANDOFF DIRECTION message is transmitted by both the primary and candidate base stations over the same traffic channel ($MP_{WCS}$, $PN^{(I)}$-3, $PN^{(Q)}$-3, $W_i$), along with a pilot signal over the pilot channel ($MP_{WCS}$, $PN^{(I)}$-3, $PN^{(Q)}$-3, $W_0$). The mobile-telephone will deem the candidate base station's HANDOFF DIRECTION message to be a multi-path signal of the primary base station and, if the candidate base station's HANDOFF DIRECTION message is one of the stronger (multi-path) signals, it will assign a RAKE receiver finger to demodulate the candidate base station's HANDOFF DIRECTION message to produce the single output signal.

In an alternate embodiment of the present invention, the handoff direction message may be transmitted by the candidate base station over any channel being listened to by the mobile-telephone, including the pilot channel of the candidate base station, neighbor base station, active set base station, etc.

Although the present invention has been described in considerable detail with reference to certain embodiments, other versions are possible. Therefore, the spirit and scope of the present invention should not be limited to the description of the embodiments contained herein.

We claim:

1. A method for performing a handoff in a wireless communication system having a plurality of base stations, wherein at least one of the plurality of base stations is in an active set of base stations, the method comprising the steps of:

assigning a first channel to enable a candidate base station to communicate with a mobile-telephone; and transmitting a first message from the candidate base station indicating the first channel, the first message being transmitted over a second channel, the second channel being used by a base station in the active set for communicating with the mobile-telephone.

2. The method of claim 1 comprising the additional step of:

transmitting a first pilot signal from the candidate base station using a third channel, the third channel being used by the base station in the active set to transmit a second pilot signal to the mobile-telephone.

3. The method of claim 2, wherein the first and second pilot signals are identical.

4. The method of claim 1, wherein the step of assigning the first channel includes the step of:

receiving a second message from the mobile-telephone at the wireless communication system indicating the candidate base station.

5. The method of claim 4, wherein the second message is received by the base station in the active set over a third channel, the third channel being used by the mobile-telephone for communicating with the base station in the active set.

6. The method of claim 1 comprising the additional step of:

transmitting a second message from the base station in the active set to the mobile-telephone indicating the first channel, the second message being transmitted over the second channel.

7. The method of claim 1, wherein the active set includes a primary base station and zero or more secondary base stations.

8. The method of claim 7, wherein the second channel is being used by the primary base station for communicating with the mobile-telephone.

9. The method of claim 7, wherein the second channel is being used by a secondary base station for communicating with the mobile-telephone.

10. The method of claim 1, wherein the wireless communication system employs code division multiple access techniques.

11. The method of claim 10 comprising the additional step of:

transmitting a first pilot signal from the candidate base station using a third channel, the third channel being used by the base station in the active set to transmit a second pilot signal to the mobile-telephone.

12. The method of claim 11, wherein the second channel is defined by a pseudo-noise sequence with a phase offset associated with the base station in the active set and a Walsh finction.

13. The method of claim 12, wherein the third channel is defined by the pseudo-noise sequence with the phase offset associated with the base station in the active set and another Walsh function.

14. A method for performing a handoff in a wireless communication system comprising the steps of:

transmitting a first message from a mobile-telephone indicating a candidate base station, the candidate base station being a base station neighboring a primary base station with a pilot signal strength over a threshold; and receiving a second message from the candidate base station indicating a forward traffic channel used by the candidate base station for communicating with the mobile-telephone.

15. The method of claim 14, wherein the second message further instructs the mobile-telephone to add the candidate base station to an active set.

16. The method of claim 14, wherein the first message is transmitted over a reverse traffic channel being used by the mobile-telephone for communicating with base stations in an active set.

17. The method of claim 14, wherein the second message is received over a forward traffic channel being used by a base station in an active set for communicating with the mobile-telephone.

18. The method of claim 14 comprising the additional step of:

receiving a third message from a base station in an active set indicating the forward traffic channel used by the candidate base station for communicating with the mobile-telephone.

19. The method of claim 14 comprising the additional step of:

receiving a pilot signal from the candidate base station.

20. The method of claim 19, wherein the pilot signal is received over a third channel, the third channel being used by the base station in the active set to transmit a second pilot signal to the mobile-telephone.

21. The method of claim 19 comprising the additional step of:

coherently demodulating th e second message using the pilot signal.

* * * * *